(12) United States Patent
Tucker et al.

(10) Patent No.: US 10,592,609 B1
(45) Date of Patent: Mar. 17, 2020

(54) HUMAN EMOTION DETECTION

(71) Applicant: Tucknologies Holdings, Inc., East Lansing, MI (US)

(72) Inventors: Craig Tucker, East Lansing, MI (US); Bryan Novak, East Lansing, MI (US)

(73) Assignee: Tucknologies Holdings, Inc., East Lansing, MI (US)

( * ) Notice: Subject to any disclaimer, the term of this patent is extended or adjusted under 35 U.S.C. 154(b) by 0 days.

(21) Appl. No.: 16/395,939

(22) Filed: Apr. 26, 2019

(51) Int. Cl.
*G06F 17/27* (2006.01)

(52) U.S. Cl.
CPC ........ *G06F 17/2785* (2013.01); *G06F 17/274* (2013.01)

(58) Field of Classification Search
CPC ........................................................ G06F 17/02
USPC ............................................ 704/1, 9, 10, 257
See application file for complete search history.

(56) References Cited

U.S. PATENT DOCUMENTS

| | | | |
|---|---|---|---|
| 5,056,021 A | 10/1991 | Ausborn | |
| 9,812,151 B1* | 11/2017 | Amini | ...................... G10L 21/10 |
| 9,864,743 B2 | 1/2018 | Srinivasan et al. | |
| 2008/0040110 A1* | 2/2008 | Pereg | ....................... G10L 17/26 704/236 |
| 2009/0063131 A1* | 3/2009 | Soumare | ............. G06F 17/2785 704/9 |
| 2009/0248399 A1 | 10/2009 | Au | |
| 2015/0120788 A1* | 4/2015 | Brun | ...................... G06F 16/22 707/812 |
| 2015/0227626 A1* | 8/2015 | Mahapatra | ............ G06F 16/951 707/706 |
| 2015/0286953 A1* | 10/2015 | Papadopoullos | ... G06F 17/2785 706/12 |
| 2016/0042359 A1* | 2/2016 | Singh | ................... G06Q 30/016 704/2 |
| 2016/0321243 A1 | 11/2016 | Walia et al. | |
| 2017/0083817 A1* | 3/2017 | Di Sciullo | ............ G06F 17/277 |

OTHER PUBLICATIONS

Reyes, A. et al., "From Humor Recognition to Irony Detection: The Figurative Language of Social Media", *Data and Knowledge Engineering*, 2012, 28 pages.
Pang, B. et al., "Opinion Mining and Sentiment Analysis", Foundation and Trends® in Information Retrieval, vol. 2, 2008, 42 pages.

* cited by examiner

*Primary Examiner* — Jesse S Pullias
(74) *Attorney, Agent, or Firm* — Sterne, Kessler, Goldstein & Fox P.L.L.C.

(57) ABSTRACT

Disclosed herein are system, method, and computer program product embodiments for recognizing a human emotion in a message. An embodiment operates by receiving a message from a user. The embodiment labels each word of the message with a part of speech (POS) thereby creating a POS set. The embodiment creates a bag of words (BOW) for the message. The embodiment determines an incongruity score for a combination of words in the POS set using a knowledgebase. The embodiment determines a preliminary emotion detection score for an emotion for the message based on the POS set and the BOW. Finally, the embodiment calculates a final emotion detection score for the emotion for the message based on the preliminary emotion detection score and the incongruity score.

20 Claims, 8 Drawing Sheets

Frame of Reference Module 304

HUMAN EMOTION DETECTION

TECHNICAL FIELD

This disclosure generally relates to human emotion detection, and more specifically to humor detection.

BACKGROUND

Systems that interact directly with human beings are increasingly using artificial intelligence to recognize and generate human emotions. For example, personal digital assistants are increasingly using artificial intelligence to recognize human emotions so that they can respond more effectively to users. Similarly, customer relationship management (CRM) bots are increasingly using artificial intelligence to recognize human emotions to provide improved interactions with customers. But these systems often suffer from various technological problems. First, these systems often rely on seeing the entire user input to recognize human emotions. This need to see the entire user input can often be expensive in terms of memory usage and computation time. Second, these systems often suffer from a long delay between receiving the user input and actually recognizing human emotions contained therein. Finally, these systems are often poor at predicting the presence of various human emotions. For example, these systems are often unable to predict the presence of humor.

SUMMARY

The present disclosure provides system, apparatus, method, and computer program product embodiments, and combinations and sub-combinations thereof, for recognizing human emotions in a user input.

In some embodiments, a message can be received from a user. Each word of the message can then be labeled with a part of speech (POS) thereby creating a POS set. A bag of words (BOW) can then be created for the message. A incongruity score can then be determined for a combination of words in the POS set using a knowledgebase. A preliminary emotion detection score for an emotion of the message can then be determined based on the POS set and the BOW. Finally, a final emotion detection score for the emotion for the message can be calculated based on the preliminary emotion detection score and the incongruity score. The use of an incongruity score together with a preliminary emotion detection score can substantially increase the accuracy of human emotion detection. The use of an incongruity score together with a preliminary emotion detection score can also reduce the memory usage and the computation cost associated with detecting human emotion in a user input.

In some embodiments, the message can be text data, visual data, or audio data. The message can be converted from audio data or visual data to text data for detection of different human emotions. This conversion to text data enables the detection of different human emotions in speeches, images, videos, or various other types of mediums as would be appreciated by a person of ordinary skill in the art.

In some embodiments, a contextual clue score, a frame of reference score, and a personal frame of reference score can be determined based on the POS set and the BOW. A preliminary emotion detection for humor can be determined based on the contextual clue score, the frame of reference score, and the personal frame of reference score. The use of a contextual clue score, a frame of reference score, and a personal frame of reference score can provide improved detection of humor in a message compared to conventional systems.

In some embodiments, a second preliminary emotion detection score for a second emotion can be determined for the message based on the POS set and the BOW. A second final emotion detection score for a third emotion for the message can be determined based on the original preliminary emotion detection score, the second preliminary emotion score, and the incongruity score. The use of multiple preliminary emotion scores enables the accurate detection of other types of human emotion that are often unable to be detected by conventional systems.

Other features of the present disclosure will be apparent from the accompanying drawings and from the detailed description.

BRIEF DESCRIPTION OF THE DRAWINGS

Embodiments of the disclosure are described with reference to the accompanying drawings, which are incorporated herein and form a part of the specification. In the drawings, generally, like reference numbers indicate identical or functionally similar elements. Additionally, generally, the left most digit(s) of a reference number identifies the drawing in which the reference number first appears.

DETAILED DESCRIPTION

As introduced previously, provided herein are system, apparatus, device, method and/or computer program product embodiments, and/or combinations and sub-combinations thereof, for recognizing human emotions in a user input.

A system that interacts directly with a human being often wants to recognize a human emotion. For example, a customer relationship management (CRM) bot may want to detect if a customer is happy or unhappy during their interaction with the bot. The bot can then change its behavior based on the detected human emotion.

Conventional approaches to recognizing human emotions in a user input suffer from several technological problems. First, conventional approaches often involve processing the entire user input (or a large portion thereof) before returning a detected human emotion contained therein. For example, in the case of a CRM bot, the bot may process an entire chat with a customer before determining the presence of a human emotion in the chat. But this need to see the entire user input can often be expensive in terms of memory usage and computation time. This can be especially true if the system is simultaneously processing many user inputs.

Second, this need to see the entire user input can cause a long delay between receiving the user input and actually recognizing human emotions contained therein. For example, a CRM bot often needs to determine the presence of a human emotion on demand rather than a long time after the human emotion actually occurred.

Finally, conventional systems are often poor at predicting the presence of various human emotions in a user input. For example, conventional approaches are often very poor at predicting the presence of humor in a user input.

Embodiments herein solve these technological problems by detecting human emotions in a user input based on incongruities in the user input. This can reduce the need to process the entire user input up front before returning the detected human emotion. This can also reduce memory usage and the computation cost associated with detecting human emotion in a user input.

Embodiments herein further solve these technological problems by detecting a human emotion in a user input based on the presence of various other human emotions in the user input. This can improve the accuracy of detection. This can also enable the detection of previously undetectable types of human emotion such as love, avarice, guilt, shame, contempt, disgust, sadness, or surprise.

Finally, embodiments herein solve the technological problem of accurately detecting humor in a user input using an objective humor model.

Figure 1:
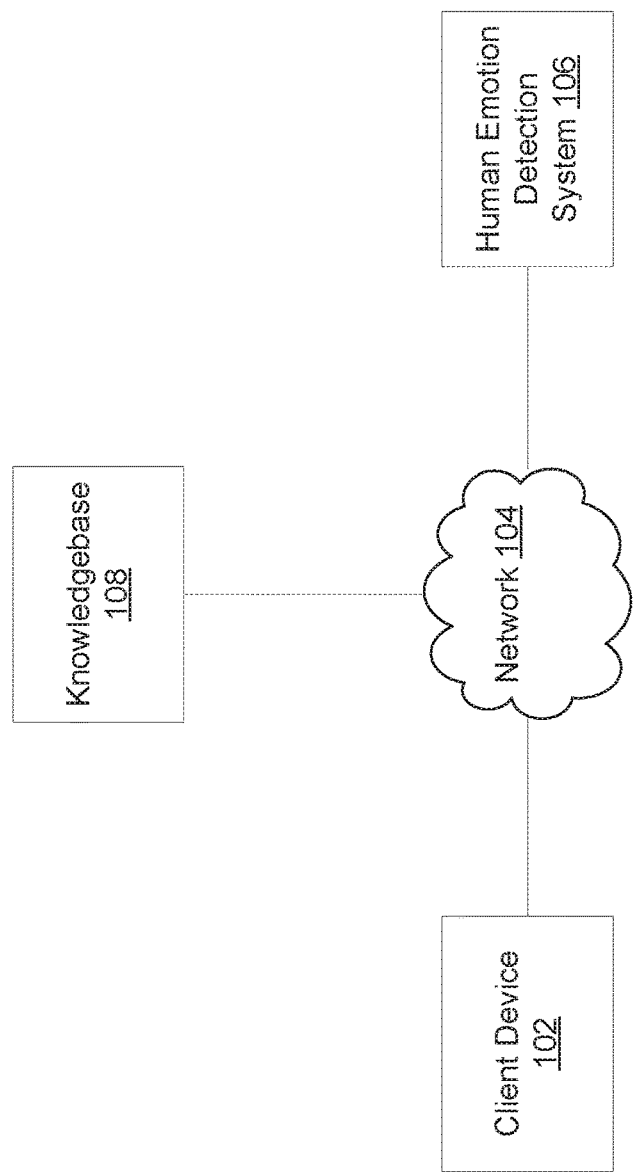
FIG. 1 is a block diagram of a system for detecting a human emotion in a message from a user, according to some embodiments.

FIG. 1 is a block diagram of a system 100 for detecting a human emotion in a message from a user, according to some embodiments. System 100 can include client device 102, human emotion detection system 106, and a knowledgebase 108.

Client device 102 can be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof. Client device 102 can also be a server computer.

Client device 102 can be any system that directly interacts with a user (e.g., a human being). Client device 102 can receive a message from the user. The message can be text, audio, or visual data. Client device 102 can then provide the message to human emotion detection system 106 to detect the presence of a human emotion in the message.

Client device 102 can be operated by a business, organization, or other entity. For example, client device 102 can be operated by a business that wants to detect the presence of a human emotion in a message from a customer.

Human emotion detection system 106 can receive the message from client device 102 over network 104. Network 104 can include, without limitation, wired and/or wireless intranet, extranet, Internet, cellular, Bluetooth and/or any other local, short range, ad hoc, regional, global communications network, as well as any combination thereof.

Human emotion detection system 106 can detect a human emotion in the message using knowledgebase 108. Knowledgebase 108 can be a database. Knowledgebase 108 can store information for analyzing the message for the presence of different human emotions. For example, knowledgebase 108 can store one or more bag of words (BOWs), common linguistic characterizations (e.g. words and phrases commonly known to relate to a particular human emotion), word attributes, or other emotionally relevant data as would be appreciated by a person of ordinary skill in the art.

Human emotion detection system 106 can receive the message using an application programming interface (API). For example, human emotion detection system 106 can receive the message using a Representational State Transfer (REST) API. As would be appreciated by a person of ordinary skill in the art, human emotion detection system 106 can receive the message using various other types of API.

The API can provide a way for client device 102 to query human emotion detection system 106 for the presence of different human emotions in the message. In response, human emotion detection system 106 can return one or more detected human emotions for the message. This can allow client device 102 (or a user of client device 102) to determine whether human emotion detection system 106 detected different human emotions in the message that a user previously inputted.

Figure 2:
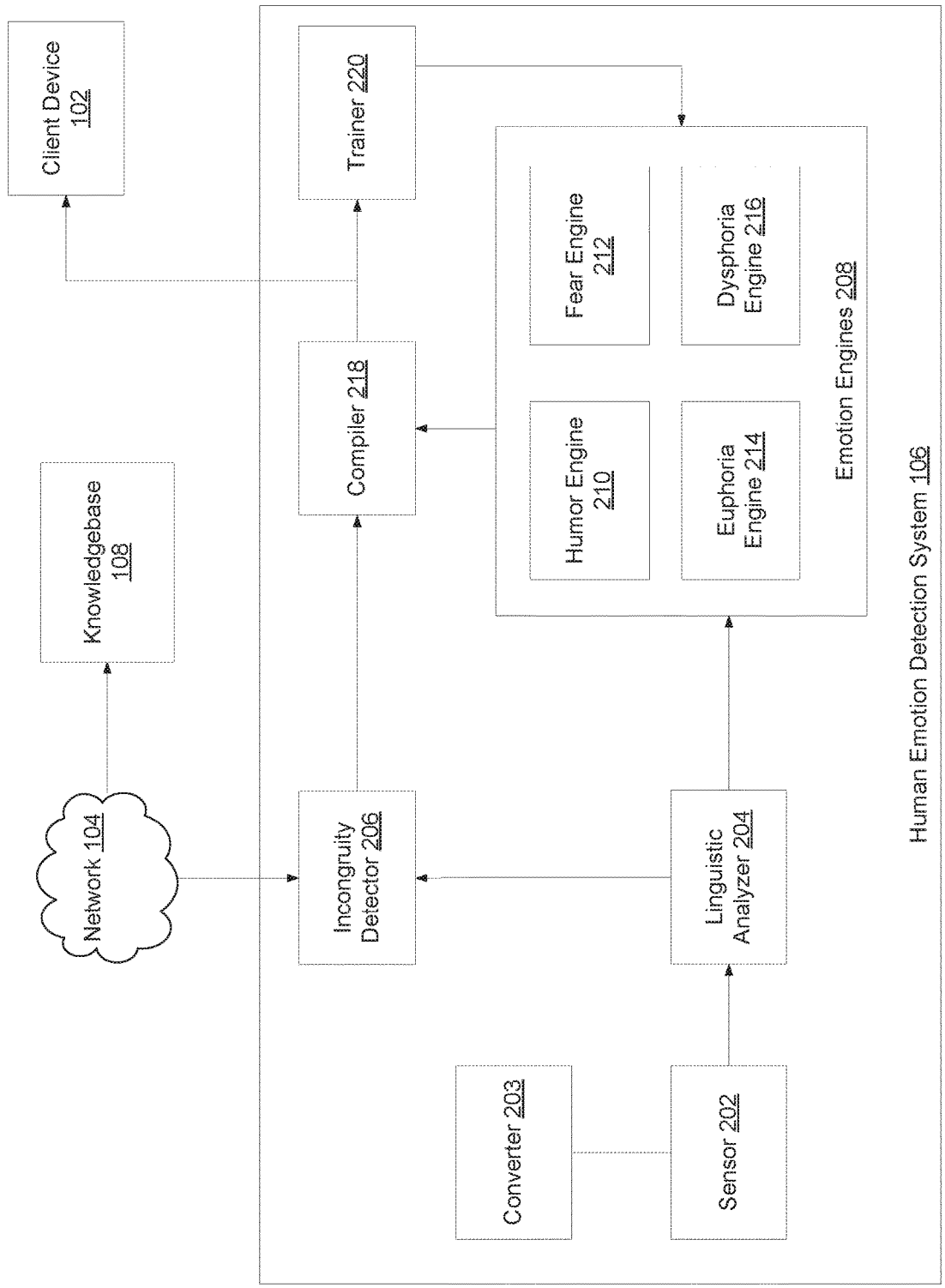
FIG. 2 is a block diagram of human emotion detection system for detecting a human emotion in a message from a user, according to some embodiments.

FIG. 2 is a block diagram of human emotion detection system 106 for detecting a human emotion in a message from a user, according to some embodiments. FIG. 2 is described with reference to FIG. 1. Human emotion detection system 106 can include sensor 202, linguistic analyzer 204, incongruity detector 206, emotion engines 208, compiler 218, and optionally converter 203 and trainer 220.

Sensor 202 can receive the message from client device 102. Sensor 202 can receive the message using an API such as, but not limited to, the REST API. Sensor 202 can receive the message as a query string using the API. The message can be any message for which human emotion detection system 106 can detect the presence of one or more human emotions.

Human emotion detection system 106 can detect the presence of one or more human emotions in a message associated with different real world applications. For example, human emotion detection system 106 can detect the presence of one or more human emotions in reviews and survey responses from a user. Human emotion detection system 106 can detect the presence of one or more human emotions in online and social media messages. Human emotion detection system 106 can detect the presence of one or more human emotions in user interactions received by a personal digital assistant such as Google's personal digital assistant, Amazon Alexa, Apple Siri, or Microsoft Cortana. Human emotion detection system 106 can detect the presence of one or more human emotions in a customer message received by a shopping bot. Human emotion detection system 106 can detect the presence of one or more human emotions in a customer message received by a CRM bot. Human emotion detection system 106 can be used to detect the presence of one or more human emotions in a message associated with various other real world applications as would be appreciated by a person of ordinary skill in the art.

Sensor 202 can receive the message in various formats. For example, sensor 202 can receive a text message from client device 102. Sensor 202 can also receive an audio message from client device 102. Sensor 202 can also receive a visual message from client device 102 (e.g., an image or video). As would be appreciated by a person of ordinary skill in the art, the message can be a message received in real time or a recorded message.

Sensor 202 can send the message to converter 203 to convert the message into a text format for processing by human emotion detection system 106. For example, converter 203 can convert an audio message into a text message using a speech-to-text conversion scheme. Converter 203 can also convert a visual message into a text message using optical character recognition (OCR). Converter 203 can translate the visual message into a text message using various other techniques as would be appreciated by a person of ordinary skill in the art. As would be appreciated by a person of ordinary skill in the art, converter 203 can be a part of human emotion detection system 106 or accessible by human emotion detection system 106 at an external system.

After receiving the message, and converting the messages into a text format (if necessary), sensor 202 can provide the message to linguistic analyzer 204. Linguistic analyzer 204 can perform linguistic analysis on the text of the message. Linguistic analyzer 204 can identify the part of speech (POS) of the words of the message. For example, linguistic analyzer 204 can identify the nouns, verbs, and modifiers of the words of the message. Linguistic analyzer 204 can label the words of the message based on their corresponding POS. This labeled set of words can be referred to as a POS set.

Linguistic analyzer 204 can also create a bag of words (BOW) for the words of the message. The BOW can represent each word in the message together with its corresponding frequency of occurrence. The BOW can disregard grammar and word order but keep multiplicity.

Linguistic analyzer 204 can output the POS set to incongruity detector 206 and emotions engine 208. Linguistic analyzer 204 can also output the BOW to incongruity detector 206 and emotions engine 208.

Incongruity detector 206 can determine one or more incongruity scores for different combinations of words in the POS set. An incongruity can be a state in which a combination of words are inconsistent with each other. An incongruity score can represent the degree to which the words are inconsistent with each other. Human emotion detection system 106 can use the one or more incongruity scores to more accurately detect a human emotion in the message. This is because the presence of an incongruity in the message can be a factor in whether a particular human emotion is present in the message or not.

Incongruity detector 206 can determine an incongruity score for a combination of words in the POS set using knowledgebase 108. Knowledgebase 108 can be a database. Knowledgebase 108 can store known word associations and frequencies. For example, knowledgebase 108 can store POS, word attributes, humor signifiers, euphoria signifiers, dysphoria signifiers, fear signifiers, references, user attributes, aural inflections, visual exposition, and machine learning information.

Word attributes can be words descriptive of or associated with a concept. For example, the words wet, cold, and blue can be descriptive of water.

Humor signifiers can be words and phrases found to be humorous or accompanying humorous words or phrases. Euphoria signifiers can be words and phrases that have been shown to be significant indicators of euphoric emotions, such as, but not limited to, love, joy, or compassion. Dysphoria signifiers can be words and phrases that have been shown to be significant indicators of dysphoric emotions, such as, but not limited to, hate, jealousy, or sadness. Fear signifiers can be words and phrases that have been shown to be significant indicators of the fear emotion.

References can include databases of categorized word lists related to, but not limited to, movies, music, or pop culture. User attributes can include demographic and user information provided by user session variables (e.g., web browser cookies) or other computer aided identification and behavioral attribution techniques by consumer data companies (e.g., Facebook, Inc. and Google LLC). Collected information based on the interactions with the system during use.

Aural inflections can include known tonal and rhythmic changes that signify psychological conditions. Visual expositions can include description of the scene in which the action takes place in a visual medium such as, but not limited to, photographs and video. Machine learning information can include results of previous machine learned data, predictive algorithms, and scripts running inferential statistics such as regressions.

Knowledgebase 108 can also store numerous other speech-related information, such as listings of jokes, movie quotations, song lyrics, and/or previously-learned word associations, to provide some examples. Knowledgebase 108 can be managed by a different entity than the entity that manages human emotion detection system 106. Human emotion detection system 106 can access knowledgebase 108 over network 104.

Incongruity detector 206 can determine an incongruity score for a combination of words in the POS set by calculating different variables for the combination of words using the information in knowledgebase 108. Incongruity detector 206 can calculate a collocate variable for the combination of words using the information in knowledgebase 108. For example, organic can collocate with food, matter, product, natural, material, compound, etc. The collocation variable can be a value between 0 and 1. The collocation variable can represent the degree to which the sequence of words in the combination of words co-occur more often than would be expected by chance.

Incongruity detector 206 can also calculate a correlation variable for the combination of words using the information in knowledgebase 108. The correlation variable can be a value between 0 and 1. The correlation variable can represent the degree of correlation between the words in the combination of words. Words can correlate based on shared attributes. For example, the words "wet, dank, and moist" when seen together can create a correlation based on the accepted attributes of the words or phrases.

Incongruity detector 206 can also calculate a frequency variable for the combination of words using the information in knowledgebase 108. The frequency variable can be a value between 0 and 1. The frequency variable can represent how frequently the combination of words occurs.

Words that appear together most frequently can have a higher score. For example, words that are frequently used together like "such as" or "in between" can score higher as they are seen together more often. Lower frequencies can indicate an incongruity between common use (e.g., what's expected) and uncommon use (e.g., what's novel or incongruous).

Incongruity detector 206 can determine the incongruity score for the combination of words based on a combination of the collocation variable, the correlation variable, and the frequency variable. The incongruity score for the combination of words can be a value between 0 and 1. Incongruity detector 206 can output the one or more incongruity scores to emotion engines 208 and/or compiler 218.

Emotion engines 208 can receive the POS set and the BOW from linguistic analyzer 204. Emotion engines 208 can also receive the one or more incongruity scores from incongruity detector 206. Emotion engines 208 can include humor engine 210, fear engine 212, euphoria engine 214, and dysphoria engine 216. Each emotion engine in emotion engines 208 can process the POS set, the BOW, and/or the one or more incongruity scores. Each engine can produce a preliminary emotion detection score for its corresponding emotion. Emotion engines 208 may also utilize the received the one or more incongruity scores to adjust the preliminary emotion detection score in order to provide a more nuanced score.

Humor engine 210 can detect whether humor is present in the message. Fear engine 212 can detect whether fear is present in the message. Euphoria engine 214 can detect whether euphoria is present in the message. Dysphoria engine 216 can detect whether dysphoria is present in the message. The preliminary emotion detection scores produced by these four emotion engines can be combined to determine a variety of other human emotions, including but not limited to love, avarice, shame, contempt, disgust, sadness, surprise. etc. However, as would be appreciated by a person of ordinary skill, emotion engines 208 can include other emotion engines to directly determine other human emotions.

Humor engine 210, fear engine 212, euphoria engine 214, and dysphoria engine 216 can each have a corresponding model for their respective emotion. In other words, each engine can analyze the POS set and/or the BOW differently based on their corresponding model.

Each engine of emotion engines 208 can be structured as a set of detectors. Each detector can receive the POS set, the BOW, and/or the one or more incongruity scores and produce a detector specific score. Each detector can look for indicators of emotional significance in the POS set and/or the BOW. Each detector can also look for indicators of emotional significance based on the one or more incongruity scores.

Each engine can combine its detector specific scores together according to its own heuristics to produce a preliminary emotion detection score. By way of example, and not limitation, this process is described for humor engine 210 in FIG. 3. Emotion engines 208 outputs the preliminary emotion detection scores to compiler 218.

Compiler 218 can receive the preliminary emotion detection scores from emotion engines 208. Compiler 218 can also receive the incongruity scores from incongruity detector 206.

Compiler 218 can apply different outcome functions based on the preliminary emotion detection scores and the incongruity scores. Each outcome function can generate a final emotion detection score for a particular emotion.

An outcome function can generate a final emotion detection score for a particular emotion by combining a corresponding preliminary emotion detection score with the incongruity scores according to various heuristics. An outcome function can also generate a final emotion detection score for an emotion not represented by an emotion engine in emotion engines 208 by combining multiple preliminary emotion detection scores with the incongruity scores according to various heuristics.

An outcome function can generate a final emotion detection score for a particular emotion by adjusting the inputs (e.g., the one or more preliminary emotion detection scores and the incongruity scores) according to various heuristics. For example, the outcome function can generate a final emotion detection score for a particular emotion by taking a weighted average of the inputs to produce a final emotion detection score.

Compiler 218 can also determine whether a final emotion detection score is above a detection threshold value. If yes, compiler 218 can return the final emotion detection score to client device 102. As would be appreciated by a person of ordinary skill in the art, compiler 218 can return multiple final emotion detection scores to client device 102.

Compiler 218 can also determine whether a final emotion detection score is above a machine learning threshold value. If yes, compiler 218 can provide the final emotion detection score to trainer 220. Trainer 220 can use the final emotion detection score to train the emotion engines in emotion engines 208. Trainer 220 can train the emotion engines in emotion engines 208 using machine learning techniques as would be appreciated by a person of ordinary skill in the art.

Figure 3:
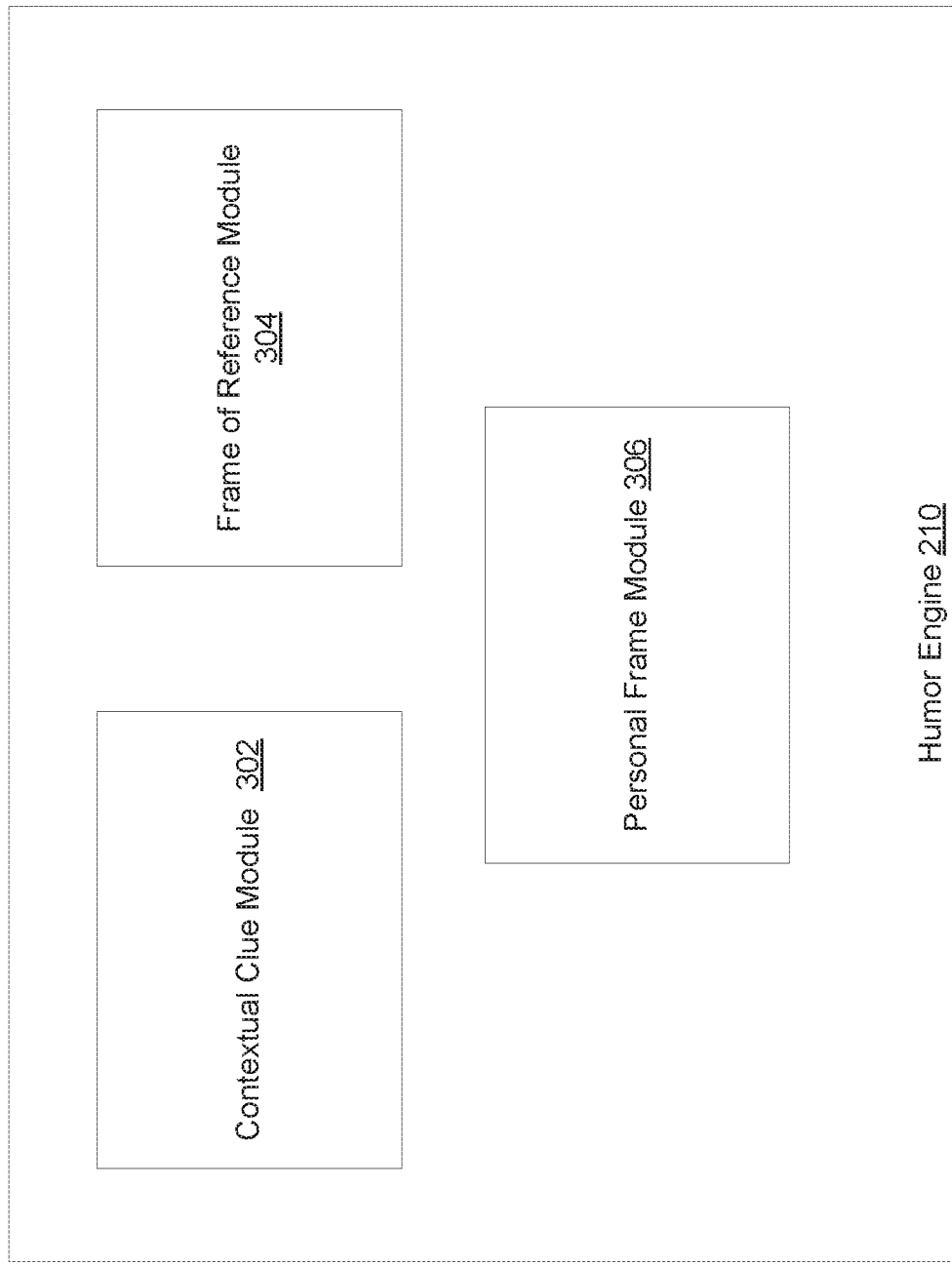
FIG. 3 is a block diagram of a humor engine for detecting humor in a message, according to some embodiments.

FIG. 3 is a block diagram of humor engine 210 for detecting humor in a message, according to some embodiments. FIG. 3 is described with reference to FIGS. 1 and 2. Humor engine 210 can include contextual clue module 302, frame of reference module 304, and personal frame module 306. As would be appreciated by a person of ordinary skill in the art, an other engine in emotion engines 208 (e.g., fear engine 212, euphoria engine 214, and dysphoria engine 216) can include a contextual clue module 302, a frame of reference module 304, and a personal frame module 306.

Humor engine 210 can determine a preliminary emotion detection score for humor for the message using an objective humor model. The objective humor model can represent humor as a communication process between a sender and a receiver. The objective humor model can involve the sender creating a message that is intended to have a desired effect on the receiver.

Using the objective humor model, humor engine 210 can determine a preliminary emotion detection score for humor for the message based on contextual clues in the message, a frame of reference for the message, and a personal frame of reference for the receiver (e.g., a user). The contextual clues can be inherent in the message (e.g., word play or innuendo). The frame of reference can be implied by text of the message (e.g., movie lines, song lyrics, common jokes, and shared experiences). The personal frame can indicate "How clever is the message?", "How we match in our cohort information?", and "How offended am I?". The personal frame of reference for the receiver (e.g., a user) can determine if the receiver accepts or rejects the humor based on their personal preferences. For example, the personal frame of reference can cause a user to reject humor because they either "don't get it" or are offended. The personal frame of reference for the receiver can also determine if the receiver understands the clues and references in the communication. The personal frame of reference for the receiver can also determine how closely the receiver's frame of reference aligns with the sender of the message. The attributes making up the personal frame of reference can be preset. However, the attributes can also be learned over time as would be appreciated by a person of ordinary skill in the art.

Humor engine 210 can determine the contextual clues using contextual clue module 302. Humor engine 210 can determine the frame of reference using frame of reference module 304. Humor engine 210 can determine the personal frame of reference using personal frame module 306.

Contextual clue module 302, frame of reference module 304, and personal frame module 306 can each contain different detectors. Each detector in contextual clue module 302, frame of reference module 304, and personal frame module 306 can calculate a corresponding detector score. Humor engine 210 can combine the detection scores from the contextual clue module 302 to produce a contextual clue score (e.g., the number of contextual clues). Humor engine 210 can combine the detector scores from the frame of reference module 304 to produce a frame of reference score. Humor engine 210 can combine the detector scores from the personal frame of reference module 306 to produce a personal frame of reference score. Humor engine 210 can then combine the contextual clue score, the frame of reference score, and the personal frame of reference score to produce the preliminary emotion detection score for humor engine 210.

Figure 4:
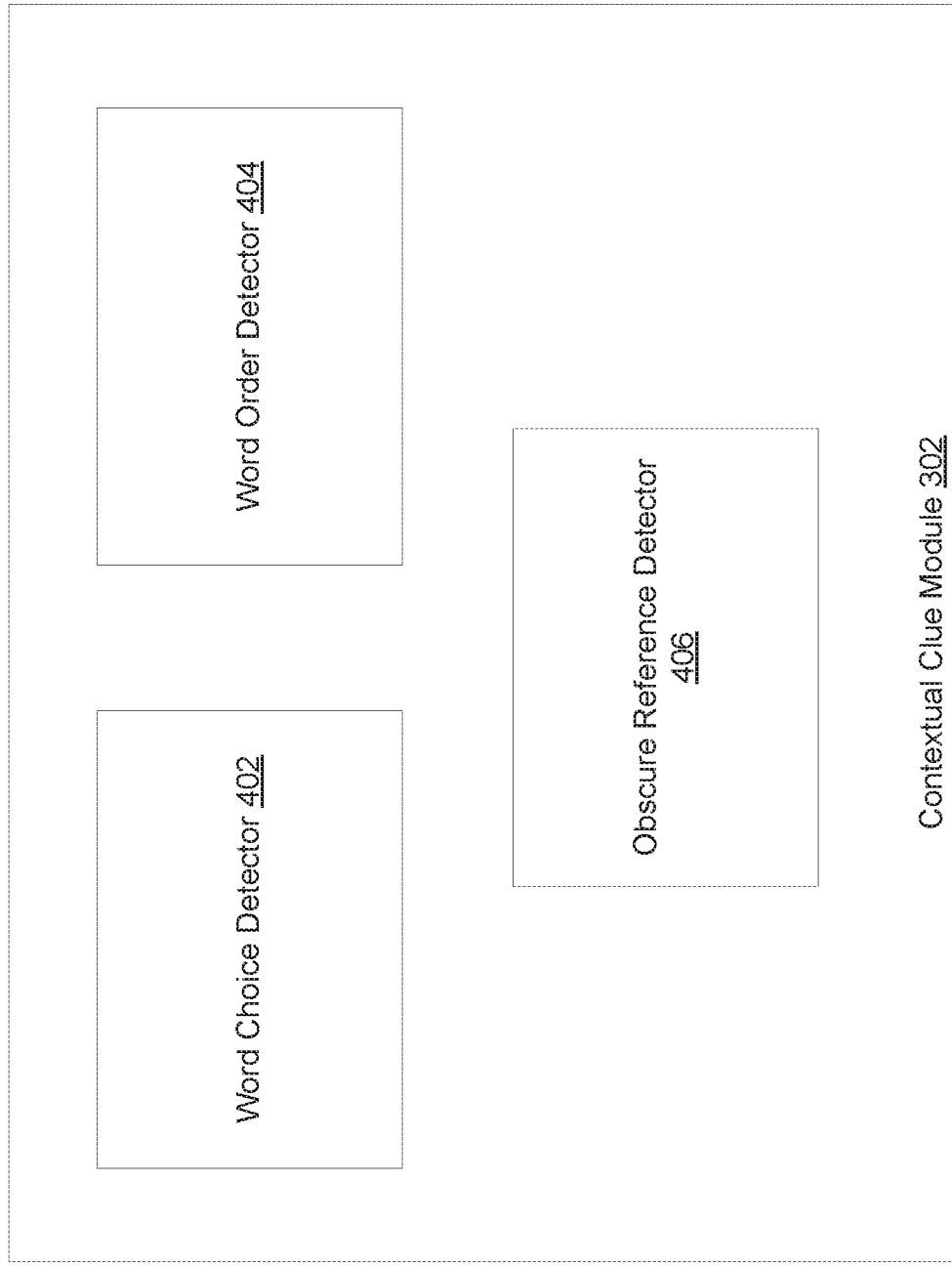
FIG. 4 is a block diagram of contextual clue module for determining a contextual clue score for a message, according to some embodiments.

FIG. 4 is a block diagram of contextual clue module 302 for determining a contextual clue score for a message, according to some embodiments. FIG. 4 is described with reference to FIGS. 1, 2, and 3. Contextual clue module 302 can include word choice detector 402, word order detector 404, and obscure reference detector 406.

Contextual clues can be clues that can be derived from a message itself. Contextual clue module 302 can combine the detection scores from word choice detector 402, word order detector 404, and obscure reference detector 406 into a contextual clues score. For example, contextual clue module 302 can sum the detection scores from word choice detector 402, word order detector 404, and obscure reference detector 406 into the contextual clues score.

Contextual clues can be word choice in the message. These can be the words used to communicate in the message. In a visual medium, word choice can be referred to as visual choice.

Word choice detector 402 can detect whether the words in the message are indicative of humor. Word choice detector 402 can detect whether the words in the message are indicative of humor using the information in knowledgebase 108.

Contextual clues can also be word order in the message. Word order can be the order that words appear in the message. The order of words can provide contextual clues as to the presence of humor. The order of words can also indicate that the sender was intending to send a humorous message. Word order detector 404 can detect whether the order of the words used in the message are indicative of humor. Word order detector 404 can detect whether the order of the words used in the message are indicative of humor using the information in knowledgebase 108.

Contextual clues can also be the number of obscure references in the message. The number of obscure references can be a contextual clue that the sender is trying to be "clever," and therefore humorous. Obscure reference detector 404 can detect the number of obscure references used in the message. Obscure reference detector 404 can detect the number of obscure references used in the message using the information in knowledgebase 108.

Figure 5:
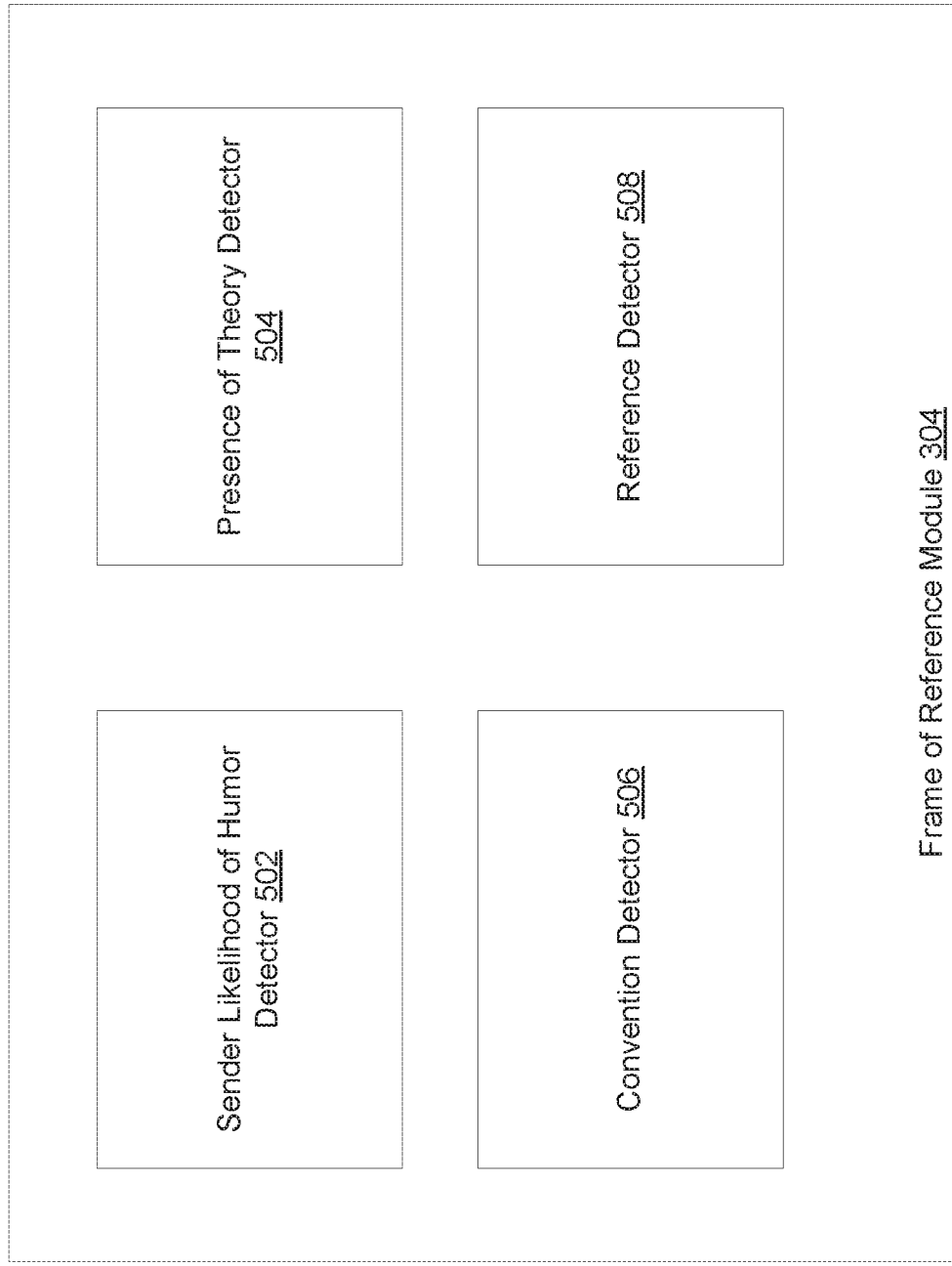
FIG. 5 is a block diagram of frame of reference module for determining a frame of reference score for a message, according to some embodiments.

FIG. 5 is a block diagram of frame of reference module 304 for determining a frame of reference score for a message, according to some embodiments. FIG. 5 is described with reference to FIGS. 1-4. Frame of reference module 304 can include sender likelihood of humor detector 502, presence of theory detector 504, convention detector 506, and reference detector 508.

The frame of reference can represent clues that can be derived from the message and from external sources. Frame of reference module 304 can combine the detection scores from sender likelihood of humor detector 502, presence of theory detector 504, convention detector 506, and reference detector 508 into a frame of reference score. For example, frame of reference module 304 can sum the detection scores from sender likelihood of humor detector 502, presence of theory detector 504, convention detector 506, and reference detector 508 into the frame of reference score.

Sender likelihood of humor detector 502 can detect the sender's proclivity to use humor. Sender likelihood of humor detector 502 can make this determination based on previous information captured about the sender. For example, sender likelihood of humor detector 502 can make this determination based on previous communications between the sender and the receiver.

Sender likelihood of humor detector 502 can make this determination based on all previously recorded messages and the total of number of times those inputs were humor. On first contact with a new sender, sender likelihood of humor detector 502 can assume the likelihood the new sender is using humor is 50/50. Sender likelihood of humor detector 502 can then change the percentage for each instance learned about the sender. For example, if 30% of the new sender's communications are detected as containing humor, sender likelihood of humor detector 502 can return a likelihood of 30%. Senders can be identified by their user identifiers (IDs). A user ID can be assigned to a sender based on phone device, phone operating system, internet protocol (IP) address, social media account, user session variables (e.g., web browser cookies), or other techniques as would be appreciated by a person of ordinary skill in the art. In the absence of previous information about the sender, sender likelihood of humor detector 502 can return a detection score of 50%, for example. This can indicate that the sender has a 50% probability of using humor in a given normal communication.

Presence of theory detector 504 can detect the number of theoretical applications for the message. The number of theoretical applications can represent the number of times in the message the sender used incongruity theory, superiority theory, or relief theory. For example, humor can be a benign incongruity of logic. Therefore, detection of an incongruity can indicate the presence of incongruity theory. Humor can be an expression of superiority of one over another. Detection of the presence of first pronouns, second personal pronouns, exclamations, zoomorphic comparisons, etc. can indicate the presence of superiority theory. Humor can be an expression of psychological relief of tension. Detection of the presence of an expression of psychological relief of tension can indicate the presence of relief theory. As would be appreciated by a person of ordinary skill in the art, presence of theory detector 504 can detect other types of theoretical applications for the message. Presence of theory detector 504 can return the number of theoretical applications for the message as its detection score.

Convention detector 506 can detect the number of conventions of humor used in the message. For example, convention detector 506 can detect the number of known-structures of humor in the message, such as joke structures, joke types, and other models of humor. Convention detector 506 can detect the number of conventions of humor using the information in knowledgebase 108. Convention detector 506 can return the number of conventions of humor used in the message as its detection score.

Reference detector 508 can detect the number of references used in the message. For example, reference detector 508 can detect the number of direct quotations from works such as movies or pop culture used in the message. Reference detector 508 can detect the number of references used in the message using the information in knowledgebase 108. Reference detector 508 can return the number of references used in the message as its detection score.

Figure 6:
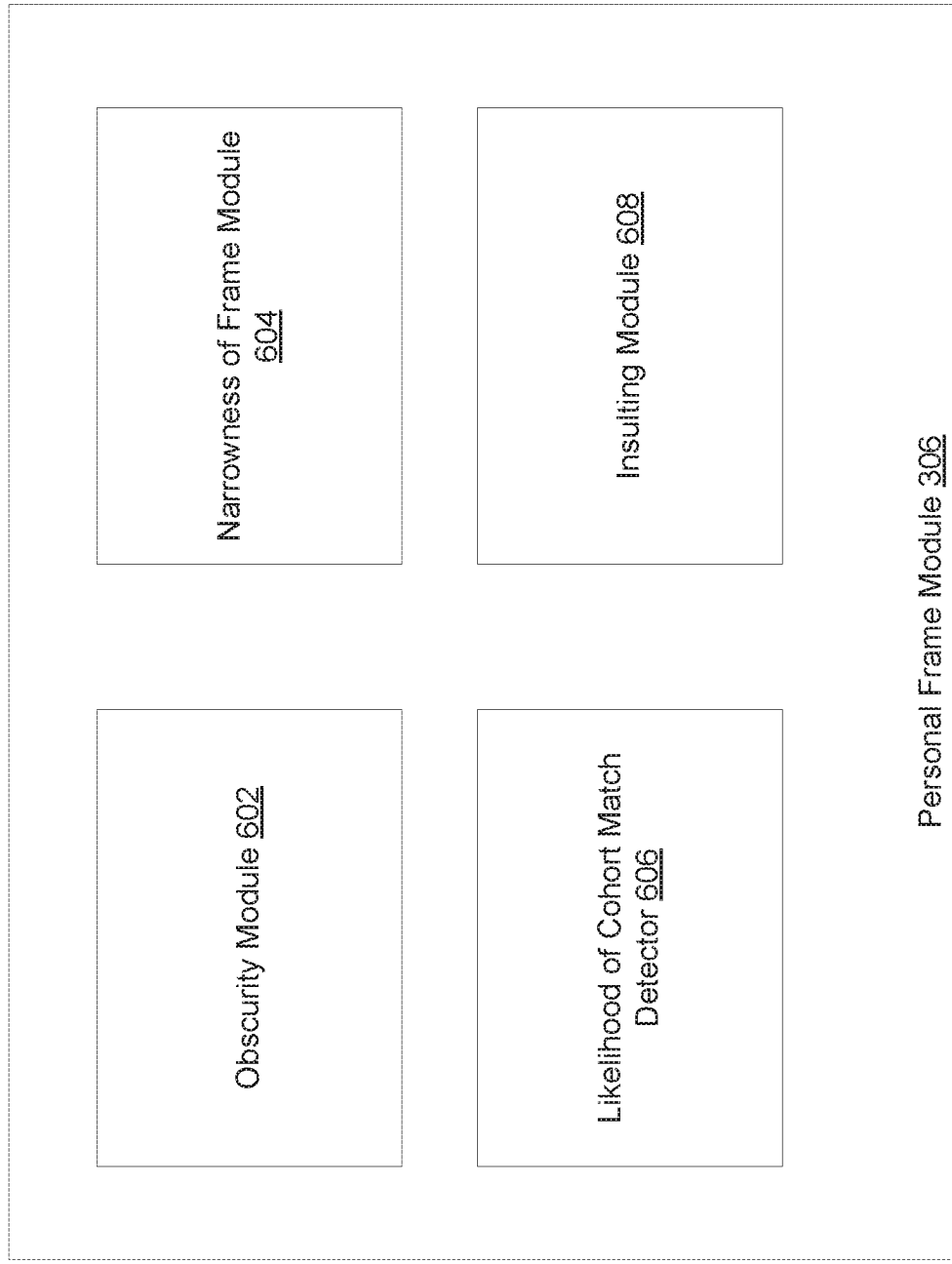
FIG. 6 is a block diagram of personal frame module for determining a personal frame for a receiver of a message, according to some embodiments.

FIG. 6 is a block diagram of personal frame module 306 for determining a personal frame for a receiver of a message, according to some embodiments. FIG. 6 is described with reference to FIGS. 1-5. Personal frame module 306 can include obscurity module 602, narrowness of frame module 604, likelihood of cohort match detector 606, and insulting module 608.

Personal frame module 306 can combine the detection scores for obscurity module 602, narrowness of frame module 604, likelihood of cohort match detector 606, and insulting module 608 into a personal frame score. For example, personal frame module 306 can sum the detection scores of the obscurity module 602, the narrowness of frames module 604, and the likelihood of cohort match detector 606. Personal frame module 306 can then divide the sum by the detection score of the insulting module 608 to produce the personal frame score.

Obscurity module 602 can detect the complexity of the message. The complexity of the message can indicate the likelihood that the receiver understands and appreciate the humor in the message. In other words, the more complex the message, the more likely the joke is obscure. The more obscure the joke, the less likely it is for the receiver to understand and appreciate the humor in the message.

Obscurity module 602 can include multiple detectors. Obscurity module 602 can calculate a detection score indicating a degree of obscurity of the message based on the result of each of its detectors. Obscurity module 602 can include a detector to detect an obscurity in the message. Obscurity module 602 can include a detector to count the number of conventions in the message. Obscurity module 602 can include a detector to count the number of humor theories used in the message. Obscurity module 602 can sum the detection scores from the three detectors together to produce detection score indicating a degree of obscurity of the message.

Narrowness of frame module 604 can calculate a narrowness value representing how likely it is for a joke or humor to be understood by a shared cohort. Narrowness of frame module 604 can calculate narrowness as the number of references divided by the number of conventions. This narrowness value can represent the window in which cohorts might detect humor. The more references per convention can result in a narrowing of the window in which cohorts might detect humor.

For example, consider the comedian Dennis Miller. He uses extremely obscure references and multiple humor conventions. As a result, he is generally understood by receivers with a much narrower cohort than other comedians.

Narrowness of frame module 604 can include multiple detectors. Narrowness of frame module 604 can include a detector to count of the number of references in the message. Narrowness of frame module 604 can also include a detector to count of the number of conventions in the message. Narrowness of frame module 604 can then divide the number of references by the number of conventions to produce detection score indicating how likely it is for a joke or humor to be understood by a shared cohort.

Likelihood of cohort match detector 606 can calculate the probability that there is a cohort match. This can be based on the proposition that people are more likely to understand humor if their personal frames align. Likelihood of cohort match detector 606 can calculate the probability that the sender and receiver are in the same cohort. The higher similarity, the higher the likelihood that the sender and receiver will understand each other. Likelihood of cohort match detector 606 can perform the cohort matching based on user attributes such as age, sex, race, geographic location, political affiliation, religion, psychology (e.g., affinity or behavioral categories), known predictors of attributes (e.g., people who like movie genre A are also 90% likely to prefer music genre B), or other factors as would be appreciated by a person of ordinary skill in the art. Likelihood of cohort match detector 606 can make this determination for both the sender and receiver. Likelihood of cohort match detector 606 can determine the probability (or match score) by summing all matching information. A higher sum can indicate a greater likelihood of a cohort match. Each attribute that is shared can increase the likelihood that both parties understand messages with others in their cohort.

As would be appreciated by a person of ordinary skill in the art, some jokes or humor may not be understood by a receiver. Some jokes or humor may also offend or elicit anger from the receiver. Personal frame module 306 can take this into account by calculating the personal frame score based on a detection score from the insulting module 608 to produce the personal frame score. For example, personal frame module 306 can calculate the personal frame score by dividing the sum of the detector scores from obscurity module 602, narrowness of frame module 604, and likelihood of cohort match detector 606 by the detector score from insulting module 608 to produce the personal frame score.

Because an insult can render the sender's intent in the message null and void, personal frame module 306 can make the detector score from insulting module 608 the denominator of the formula for calculating the personal frame score. This is because making it the denominator can negate the entire personal frame. If the receiver isn't insulted, then the preliminary emotion detection score for humor is simply the clues encoded by the sender (e.g., the detection scores from obscurity module 602, narrowness of frames module 604, and likelihood of cohort match detector 606). Moreover, for the sender, there can be no insult otherwise they wouldn't make the joke and the message wouldn't be sent. This does not mean it cannot be insulting, but it doesn't preclude the sender from sending the message.

Insulting module 608 can take inputs as simple yes or no (e.g., binary 0 or 1). Zero can indicate "yes, it is an insult," and 1 can indicate "no, it is not insulting enough to be offensive." Insulting module 608 can include a detector that determines if the receiver is the subject of a joke. Insulting module 608 can include a detector that determines if the sender is implying their superiority. Insulting module 608 can include a detector that determines if there is a presence of racism, sexism, bigotry, etc. that is offensive to the receiver. Each detector outputs 0 or 1 depending on the presence of an insult. As would be appreciated by a person of ordinary skill in the art, each receiver can have different tolerances for these factors.

As described above, personal frame module 306 can combine the detection scores for obscurity module 602, narrowness of frame module 604, likelihood of cohort match detector 606, and insulting module 608 into a single personal frame score. Personal frame module 306 can sum the detection scores of obscurity module 602, narrowness of frames module 604, and the likelihood of cohort match detector 606. Personal frame module 306 can then divide the sum by the detection score from insulting module 608 to produce the personal frame score.

By way of example, contextual clue module 302 can first calculate a contextual clue score. For example, obscure reference detector 406 can calculate the number of obscure references in the message. For example, the number of obscure references can be 2. Word choice detector 402 can calculate the number of word choice incongruities. Word choice detector 402 can calculate the number of word choice incongruities based on various factors as would be appreciated by a person of ordinary skill in the art. For example, the number of word choice incongruities can be 0. Word order detector 404 can calculate the number of word order incongruities. Word choice detector 402 can calculate the number of word order incongruities based on various factors as would be appreciated by a person of ordinary skill in the art. For example, the number of word order incongruities can be 1. Thus, the contextual clue score can be sum of the number of obscure reference (e.g., 2) and the number of word order incongruities (e.g., 1) which totals to 3.

Word choice detector 402 can calculate the number of word choice incongruities based on words and phrases with duplicitous meaning, such as, but not limited to, metaphors, homographs, homophones, etc. A homograph can be a duplicitous lingual device in which hidden meaning can be encoded. A homograph can be used in humor to signal an incongruity by use of dual meanings. For example, consider the message "I was hoping to steal some leftovers from the party but I guess my plans were foiled." In this message, foil can be a term representing a material used for wrapping leftovers but it can also be a term for when a crime is stopped in the process of being committed. The use of a word (e.g., foil) with multiple meanings can be a reliable indicator that the sender is using humor. Word choice detector 402 can detect a word choice incongruity based on this homograph.

Word choice detector 402 can also calculate the number of word choice incongruities based on shared attributes or overloaded meaning. For example, in the above message, word choice detector 402 can detect a word choice incongruity based on "foiled." This is because an attribute of leftovers can be aluminum foil. The word "foil" can also be correlated with the word "steal." Thus, there can be a shared attribute with leftovers.

Word choice detector 402 can also calculate the number of word choice incongruities based on the presence of different types of pronoun. For example, in the above message, word choice detector 402 can detect a word choice incongruity based on the first person pronouns of "I" and "my."

Word order detector 404 can calculate the number of word order incongruities based on a signifier. For example, in the above message, word choice detector 402 can detect a word order incongruity based on the signifier "foiled" appearing last in the sentence. Frame of reference module 304 can then calculate a frame of reference score. For example, sender likelihood of humor detector 502 can calculate the sender likelihood of humor. Sender likelihood of humor detector 502 can start the sender likelihood of humor at 50/50 and then adjust the sender likelihood of humor based on learning from interactions with the sender. For example, the sender likelihood of humor can eventually be determined to be 80% based on learning from interactions with the sender. Presence of theory detector 504 can calculate the number of theoretical applications for the message. For example, the number of theoretical applications can be 1, which could represent a presence of an incongruity theory, superiority theory, or relief theory. Convention detector 506 can calculate the number of conventions of humor used in the message. For example, the number of conventions of humor can be 1. In the case of humor, conventions can be a set of narrative formats or structures that are archetypical to the practice of comedy. For example, conventions can include, but are not limited to, The Rule of Threes, The 180, Fish out-of Water, and Absurdity. Reference detectors 508 can calculate the number of references used in the message. For example, the number of references can be 0. Thus, the frame of reference score can be the sum of the sender likelihood of humor (e.g., 0.80), the number of theoretical applications (e.g., 1), and the number of conventions of humor used in the message (e.g., 1) which totals to 2.8.

Personal frame module 306 can then calculate the personal frame score. For example, obscurity module 602 can calculate the obscurity score. Obscurity module 602 can calculate the number recognized obscurities. For example, the number of recognized obscurities can be 0. Obscurity module 602 can calculate the number of conventions. For example, the number of conventions can be 1. Obscurity module 602 can calculate the number of humor theories used. For example, the number of humor theories can be 1. Thus, the obscurity score can be the sum of the number recognized obscurities (e.g., 0), the number of conventions (e.g., 1), and the number of humor theories (e.g., 1) which totals to 2.

Narrowness of frame module 604 can calculate the narrowness score based on the number of references and the number of conventions. For example, the number of references can be 0 and the number of conventions can be 1. Thus, the narrowness score can be the result of dividing the number of references (e.g., 0) by the number of conventions (e.g., 1) which is 0.

Likelihood of cohort match detector 606 can calculate the cohort likelihood score. For example, the cohort likelihood score can be 2. Likelihood of cohort match detector 606 can calculate the cohort likelihood score based on various factors such as, but not limited to, age, sex, race, geographic location, political affiliation, religion, or other factors as would be appreciated by a person of ordinary skill in the art.

Insulting module 608 can calculate the insult score. For example, the insult score can be 1 (e.g., no insult). Insulting module 610 can calculate the insult score based on if the receiver is the subject of a joke, if the sender is implying their superiority, or if there is a presence of racism, sexism, bigotry, etc. that is offensive to the receiver.

Personal frame module 306 can calculate the personal frame score based on the sum of the detection scores of obscurity module 602, narrowness of frame module 604, likelihood of cohort match detector 606. The sum can be 4. Personal frame module 306 can then divide the sum by the insult score of 1. Thus, the personal frame score can be 4.

Humor engine 210 can then sum the contextual clue score (e.g., 3) and the frame of reference score (e.g., 2.8), and divide the result by the personal frame score (e.g., 4). The resulting preliminary emotion detection score for humor can be 5.8/4=1.45. This preliminary emotion detection score for humor can represent the degree which both the sender and receiver communicate humor without misinterpretation.

Compiler 218 can receive the preliminary emotion detection score for humor from humor engine 210. Compiler 218 can also receive one or more incongruity scores from incongruity detector 206. Compiler 218 can then apply an outcome function based on the preliminary emotion detection humor score and the incongruity scores. Compiler 218 can also apply an outcome function based on just the one or more incongruity scores. The outcome function can generate one or more final emotion detection scores (e.g., a final emotion detection score for humor). For example, the outcome function can generate a final emotion detection score for humor of 99% likely. This may be based on an incongruity of 85% likely, 5 contextual clues, 3.5 frames, and a 4.5 personal frame.

Figure 7:
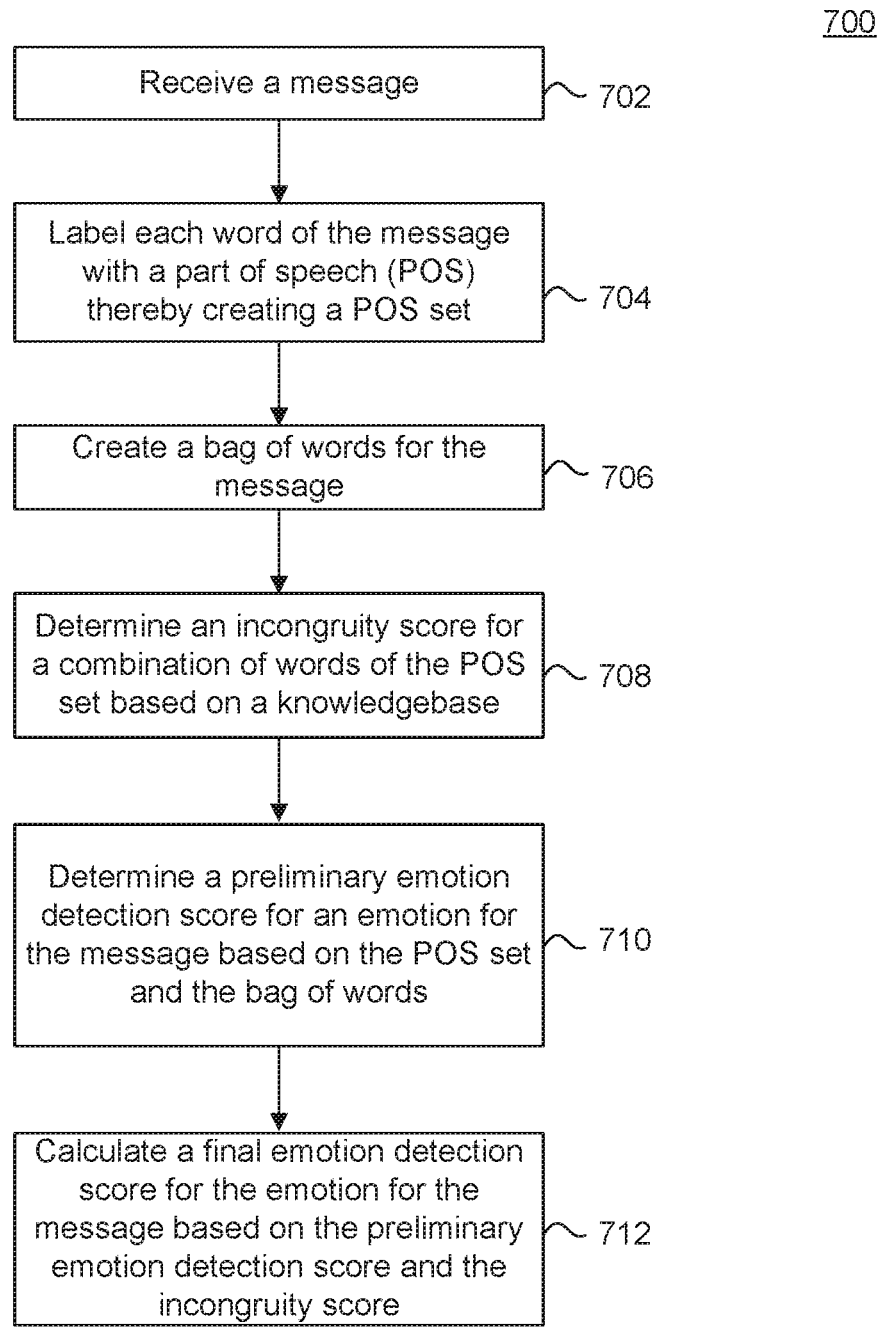
FIG. 7 is a flowchart illustrating a process for detecting a human emotion in a message from a user, according to some embodiments.

FIG. 7 is a flowchart for a method 700 for detecting a human emotion in a message from a user, according to an embodiment. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art.

Method 700 shall be described with reference to FIGS. 1-6. However, method 700 is not limited to that example embodiment.

In 702, sensor 202 receives a message. Sensor 202 can receive the message from a user of client device 102. Sensor 202 can receive the message using an API such as, but not limited to, the REST API. Sensor 102 can receive the message in various formats such as, but not limited to, text data, audio data, or visual data.

In 704, linguistic analyzer 204 labels each word of the message with a part of speech (POS) thereby creating a POS set.

In 706, linguistic analyzer 204 creates a bag of words (BOW) for the message.

In 708, incongruity detector 206 determines an incongruity score for a combination of words in the POS set using knowledgebase 108. As would be appreciated by a person of ordinary skill in the art, incongruity detector 206 can determine incongruity scores for various combinations of words in the POS set based on knowledgebase 108.

Incongruity detector 206 can determine an incongruity score for a combination of words in the POS set by calculating different variables for the combination of words using the information in knowledgebase 108. Incongruity detector 206 can calculate a collocation variable, a correlation variable, or a frequency variable. Incongruity detector 206 can determine the incongruity score for the combination of words based on a combination of the collocation variable, the correlation variable, and the frequency variable.

In 710, an emotion engine in emotion engines 208 determines a preliminary emotion detection score for a corresponding emotion for the message based on the POS set and the BOW. The emotion engine in emotion engines 208 can also determine the preliminary emotion detection score based on the incongruity score of 708. As would be appreciated by a person of ordinary skill in the art, other emotion engines than those included within emotion engines 208 can determine corresponding preliminary emotion detection scores for their emotions based on the POS set and the BOW.

In 712, compiler 218 calculates a final emotion detection score for an emotion for the message based on the preliminary emotion detection score and the incongruity score. As would be appreciated by a person of ordinary skill in the art, compiler 218 can calculate final emotion detection scores for other emotions for the message based on other preliminary emotion detection scores and the incongruity score.

Figure 8:
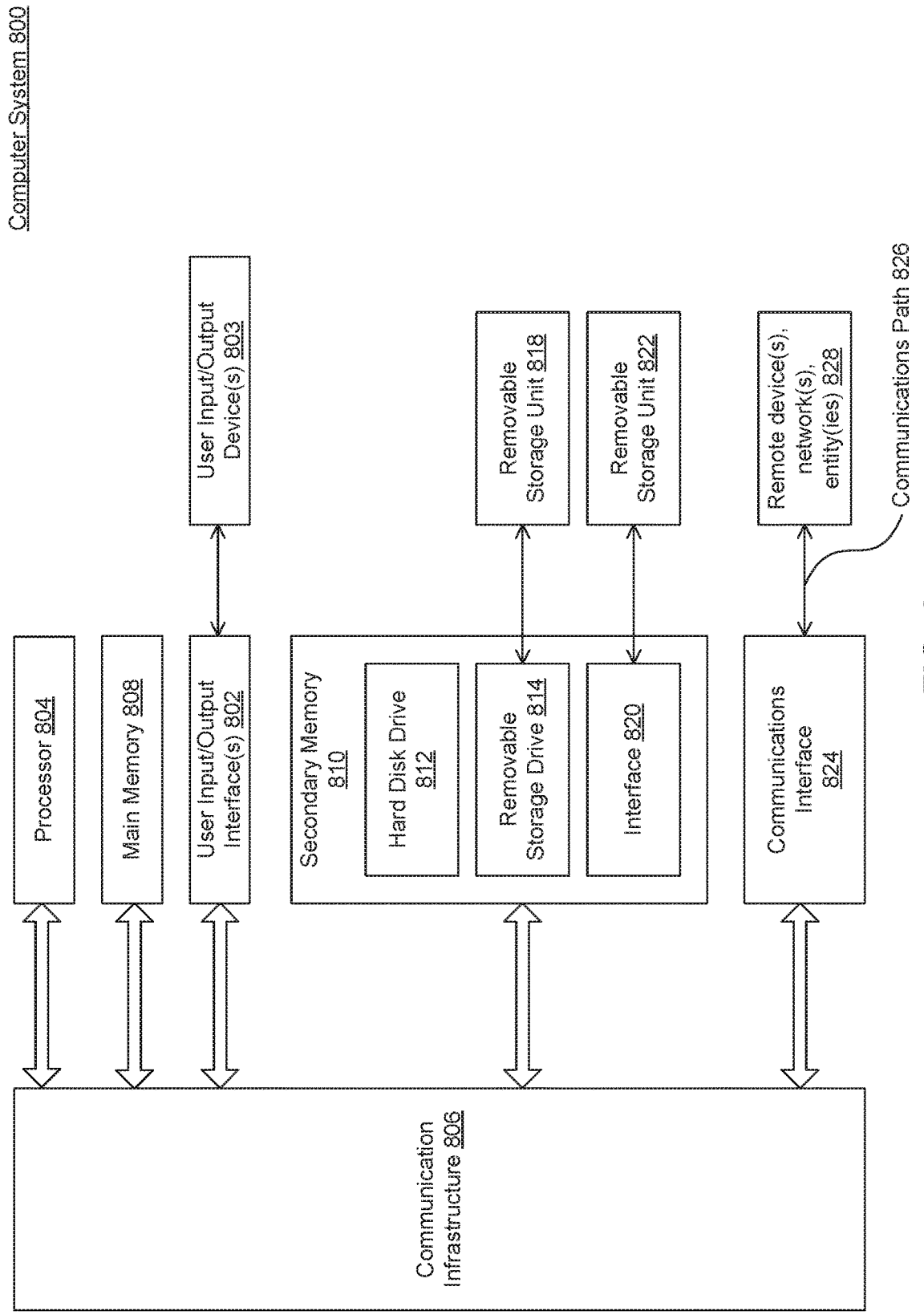
FIG. 8 is an example computer system useful for implementing various embodiments.

Various embodiments may be implemented, for example, using one or more well-known computer systems, such as computer system 800 shown in FIG. 8. One or more computer systems 800 may be used, for example, to implement any of the embodiments discussed herein, as well as combinations and sub-combinations thereof.

Computer system 800 may include one or more processors (also called central processing units, or CPUs), such as a processor 804. Processor 804 may be connected to a communication infrastructure or bus 806.

Computer system 800 may also include user input/output device(s) 803, such as monitors, keyboards, pointing devices, camera, microphone, brain imaging device, etc., which may communicate with communication infrastructure 806 through user input/output interface(s) 802.

One or more of processors 804 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 may also include a main or primary memory 808, such as random access memory (RAM). Main memory 808 may include one or more levels of cache. Main memory 808 may have stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 may include a computer usable or readable storage device having stored thereon computer software (control logic) and/or data. Removable storage unit 818 may be a floppy disk, magnetic tape, compact disk, DVD, optical storage disk, and/or any other computer data storage device. Removable storage drive 814 may read from and/or written to removable storage unit 818.

Secondary memory 810 may include other means, devices, components, instrumentalities or other approaches for allowing computer programs and/or other instructions and/or data to be accessed by computer system 800. Such means, devices, components, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 may enable computer system 800 to communicate and interact with any combination of external devices, external networks, external entities, etc. (individually and collectively referenced by reference number 828). For example, communication interface 824 may allow computer system 800 to communicate with external or remote devices 828 over communications path 826, which may be wired and/or wireless (or a combination thereof), and which may include any combination of LANs, WANs, the Internet, etc. Control logic and/or data may be transmitted to and from computer system 800 via communication path 826.

Computer system 800 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 800 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 800 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 8. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method for detecting an emotion in a message, comprising:
   receiving, by at least one processor, the message;
   labeling, by the at least one processor, each word of the message with a part of speech (POS) thereby creating a POS set;
   determining, by the at least one processor, an incongruity score for a combination of words in the POS set based on a collocation variable, a correlation variable, and a frequency variable for the combination of words in the POS set;
   determining, by the at least one processor, a preliminary emotion detection score for an emotion for the message based on the POS set; and
   calculating, by the at least one processor, a final emotion detection score for the emotion for the message based on the preliminary emotion detection score and the incongruity score.

2. The method of claim 1, wherein the message comprises text data, visual data, or audio data.

3. The method of claim 1, wherein the determining the incongruity score for the combination of words in the POS set comprises:
   calculating the collocation variable for the combination of words in the POS set based on a knowledgebase;
   calculating the correlation variable for the combination of words in the POS set based on the knowledgebase; and
   calculating the frequency variable for the combination of words in the POS set based on the knowledgebase.

4. The method of claim 1, wherein the determining the preliminary emotion detection score for the emotion for the message comprises:
   determining a contextual clue score based on the POS set;
   determining a frame of reference score based on characteristics associated with a sender of the message;
   determining a personal frame of reference score based on characteristics associated with a receiver of the message; and determining a preliminary emotion detection score for humor based on the contextual clue score, the frame of reference score, and the personal frame of reference score.

5. The method of claim 1, further comprising:
outputting the final emotion detection score for the emotion for the message to a client device based on the final emotion detection score for the message being above a detection threshold value.

6. The method of claim 1, further comprising:
determining a second preliminary emotion detection score for a second emotion for the message based on the POS set; and
determining a second final emotion detection score for a third emotion for the message based on the preliminary emotion detection score, the second preliminary emotion score, and the incongruity score.

7. The method of claim 1, further comprising:
training the at least one processor configured to determine the preliminary emotion detection score for the emotion for the message based on the final emotion detection score for the emotion for the message being above a machine learning threshold value.

8. A system, comprising:
a memory;
a sensor configured to receive a message; and
at least one processor coupled to the memory and configured to:
convert the message to text;
label each word of the message with a part of speech (POS) thereby creating a POS set;
create a bag of words (BOW) for the message;
determine an incongruity score for a combination of words in the POS set based on a collocation variable, a correlation variable, and a frequency variable for the combination of words in the POS set;
determine a preliminary emotion detection score for an emotion for the message based on the POS set and the BOW; and
calculate a final emotion detection score for the emotion for the message based on the preliminary emotion detection score and the incongruity score.

9. The system of claim 8, wherein the message comprises text data, visual data, or audio data.

10. The system of claim 8, wherein to determine the incongruity score for the combination of words in the POS set, the at least one processor is configured to:
calculate the collocation variable for the combination of words in the POS set based on a knowledgebase;
calculate the correlation variable for the combination of words in the POS set based on the knowledgebase; and
calculate the frequency variable for the combination of words in the POS set based on the knowledgebase.

11. The system of claim 8, wherein to determine the preliminary emotion detection score for the emotion for the message, the at least one processor is configured to:
determine a contextual clue score based on the POS set and the BOW;
determine a frame of reference score based on characteristics associated with a sender of the message;
determine a personal frame of reference score based on characteristics associated with a receiver of the message; and
determine a preliminary emotion detection score for humor based on the contextual clue score, the frame of reference score, and the personal frame of reference score.

12. The system of claim 8, the at least one processor further configured to:
output the final emotion detection score for the emotion for the message to a client device based on the final emotion detection score for the message being above a detection threshold value.

13. The system of claim 8, the at least one processor further configured to:
determine a second preliminary emotion detection score for a second emotion for the message based on the POS set and the BOW; and
determine a second final emotion detection score for a third emotion for the message based on the preliminary emotion detection score, the second preliminary emotion score, and the incongruity score.

14. The system of claim 8, the at least one processor further configured to:
train the at least one processor configured to determine the preliminary emotion detection score for the emotion for the message based on the final emotion detection score for the emotion for the message being above a machine learning threshold value.

15. A non-transitory computer-readable device having instructions stored thereon that, when executed by at least one computing device, causes the at least one computing device to perform operations comprising:
receiving a message;
labeling each word of the message with a part of speech (POS) thereby creating a POS set;
creating a bag of words (BOW) for the message;
determining an incongruity score for a combination of words in the POS set based on a collocation variable, a correlation variable, and a frequency variable for the combination of words in the POS set;
determining a preliminary emotion detection score for an emotion for the message based on the POS set and the BOW; and
calculating a final emotion detection score for the emotion for the message based on the preliminary emotion detection score and the incongruity score.

16. The non-transitory computer-readable device of claim 15, the determining the incongruity score for the combination of words in the POS set comprising:
calculating the collocation variable for the combination of words in the POS set based on a knowledgebase;
calculating the correlation variable for the combination of words in the POS set based on the knowledgebase; and
calculating the frequency variable for the combination of words in the POS set based on the knowledgebase.

17. The non-transitory computer-readable device of claim 15, the determining the preliminary emotion detection score for the emotion for the message comprising:
determining a contextual clue score based on the POS set and the BOW;
determining a frame of reference score based on characteristics associated with a sender of the message;
determining a personal frame of reference score based on characteristics associated with a receiver of the message; and
determining a preliminary emotion detection score for humor based on the contextual clue score, the frame of reference score, and the personal frame of reference score.

18. The non-transitory computer-readable device of claim 15, the operations further comprising:

outputting the final emotion detection score for the emotion for the message to a client device based on the final emotion detection score for the message being above a detection threshold value.

19. The non-transitory computer-readable device of claim 15, the operations further comprising:
   determining a second preliminary emotion detection score for a second emotion for the message based on the POS set and the BOW.

20. The non-transitory computer-readable device of claim 19, the operations further comprising:
   determining a second final emotion detection score for a third emotion for the message based on the preliminary emotion detection score, the second preliminary emotion score, and the incongruity score.

* * * * *